United States Patent
Reasoner et al.

(10) Patent No.: US 6,758,400 B1
(45) Date of Patent: Jul. 6, 2004

(54) DUAL BAR CODE READING SYSTEM FOR A DATA STORAGE SYSTEM

(75) Inventors: Kelly J Reasoner, Ft Collins, CO (US); Kristianne E Johnson, Fort Collins, CO (US); Richard Lynn Gardner, Jr., Greeley, CO (US)

(73) Assignee: Hewlett-Packard Development Company, L.P., Palo Alto, CA (US)

( * ) Notice: Subject to any disclaimer, the term of this patent is extended or adjusted under 35 U.S.C. 154(b) by 72 days.

(21) Appl. No.: 09/716,878

(22) Filed: Nov. 20, 2000

(51) Int. Cl.[7] .................................................. G06K 7/10
(52) U.S. Cl. ......................... 235/462.01; 235/462.08; 235/462.12; 235/462.16; 235/462.2
(58) Field of Search ................. 235/462.01, 462.09, 235/462.1, 494, 462.12, 462.07, 462.08

(56) References Cited

U.S. PATENT DOCUMENTS

| | | | | |
|---|---|---|---|---|
| 4,963,719 A | | 10/1990 | Brooks et al. | |
| 5,034,904 A | | 7/1991 | Moy | |
| 5,083,816 A | * | 1/1992 | Folga et al. | ................... 283/81 |
| 5,410,139 A | * | 4/1995 | Barkan | ................ 235/462.27 |
| 5,457,308 A | * | 10/1995 | Spitz et al. | ................. 235/462 |
| 5,481,103 A | * | 1/1996 | Wang | ........................ 235/494 |
| 5,489,767 A | * | 2/1996 | Billington | .................... 235/437 |
| 5,495,097 A | * | 2/1996 | Katz et al. | ................... 235/462 |
| 5,710,419 A | * | 1/1998 | Wang et al. | ................ 235/487 |
| 5,821,519 A | * | 10/1998 | Lee et al. | .................... 235/462 |
| 5,923,022 A | * | 7/1999 | Penn et al. | ............ 235/462.08 |
| 6,025,972 A | | 2/2000 | Schmidtke et al. | ....... 360/98.06 |
| 6,032,863 A | * | 3/2000 | Nethery, III | ........... 235/462.07 |
| 6,164,543 A | * | 12/2000 | Kato et al. | ............. 235/462.25 |
| 6,371,371 B1 | * | 4/2002 | Reichenbach | ............... 235/454 |

* cited by examiner

*Primary Examiner*—Karl D. Frech
*Assistant Examiner*—Ahshik Kim

(57) ABSTRACT

A bar code reading system comprises a first bar code label and a second bar code label. The first bar code label is positioned on an object at a first location and in a first orientation. The second bar code label is positioned on the object at a second location and in a second orientation. The first and second bar code labels each have indicia thereon representative of a label data set. Bar code reading apparatus positionable next to the object has a limited field of view such that the bar code reading apparatus reads only first and second portions of the first and second bar code labels. The bar code reading apparatus produces first and second data sets representative of the first and second portions. A data processing system operatively associated with the bar code reading apparatus combines the first and second data sets to produce a combined data set representative of the label data set.

21 Claims, 6 Drawing Sheets

DUAL BAR CODE READING SYSTEM FOR A DATA STORAGE SYSTEM

FIELD OF INVENTION

This invention relates generally to bar code reading systems and more specifically to a dual bar code reading system for a data cartridge storage system.

BACKGROUND

Machine readable codes, such as bar codes, are well-known in the art and are used in various applications to allow a machine (e.g., a bar code reader) to read the code. Perhaps the most common application of such machine readable codes (e.g., bar codes) is their use in inventory control situations where it is desired to identify and keep track of the movement of objects and things.

Regardless of the application in which it is used, a typical bar code reading device will include an optical system suitable for detecting the bar codes on the objects. Depending on the particular application, the bar code reader may be provided with an illumination system suitable for illuminating the bar code to allow the same to be detected.

Bar code reading devices may be used in data storage systems to read bar code labels placed on data cartridges. Data encoded on the bar code labels are used by the data storage system to keep track of (i.e., inventory) the locations and identities of the various data cartridges contained in the data storage system.

In general, data storage systems, of which there are many different types, are used for storing data cartridges at known locations and for retrieving those data cartridges from those locations so that data may be written to or read from those data cartridges. Such data storage systems are often referred to as "juke box" data storage systems, particularly if they can accommodate a large number of individual data cartridges.

A typical data storage system may include one or more different types of cartridge receiving devices for holding the various data cartridges. For example, one type of cartridge receiving device may comprise a cartridge storage rack or "magazine" while another type of cartridge receiving device may comprise a cartridge read/write device. The cartridge storage racks or magazines serve to provide storage locations for the data cartridges and are commonly arranged so that they form one or more vertical stacks. The cartridge read/write device may be located adjacent the cartridge stack, although the cartridge read/write device may be positioned at any convenient location. The data storage system may also be provided with a cartridge access device for accessing the various data cartridges contained in the cartridge receiving devices and a positioning system for moving the cartridge access device among the various cartridge receiving devices contained in the data storage system.

Typically, if certain data contained on a particular data cartridge is desired, the host computer system will issue commands to a control system associated with the data storage system. In response to those commands, the control system will actuate the positioning system to move the cartridge access device along the cartridge storage racks or magazines until the cartridge access device is positioned adjacent the desired data cartridge. As mentioned above, a bar code reading device may assist the control system in determining when the cartridge access device has been positioned adjacent the desired data cartridge. In other words, the bar code reading device reads the bar code label positioned on the data cartridge to verify that the data cartridge is the desired data cartridge. If not, the cartridge access device may be moved to another data cartridge. Once the desired data cartridge has been located, the cartridge access device may remove the desired cartridge from the cartridge storage rack and carry it to the cartridge read/write device. The cartridge access device may then insert the selected data cartridge into the cartridge read/write device so that the host computer may thereafter read data from or write data to the selected data cartridge. After the read/write operation is complete, the cartridge access device may remove the data cartridge from the cartridge read/write device and return it to its appropriate location in the cartridge storage rack.

Although many types of data storage devices and media (e.g., magnetic disk or tape, optical disk, etc.) may be used in data storage systems of the type just described, a commonly used data storage device comprises a digital linear tape ("DLT") cartridge. A bar code label is often placed on each cartridge in order to distinguish and identify the various DLT cartridges. In one application, the bar code label contains six characters.

Recently, DLT cartridges are being replaced in data storage systems with linear tape open ("LTO") cartridges. The newer LTO cartridges are designed to be compatible with DLT systems so that most existing DLT systems can be converted for use with the new LTO cartridges. Unfortunately, however, the newer LTO cartridges are not entirely compatible with DLT cartridges. For example, as was the case with the DLT cartridges, the LTO cartridges are provided with bar code labels so that the various LTO cartridges contained within the data storage system may be identified and inventoried. However, the bar code labels utilized with the LTO cartridges comprise eight characters and are physically longer than the 6-character bar code labels previously used to identify the DLT cartridges. Since the LTO bar code labels are longer than the bar code labels previously used with DLT cartridges, most bar code readers utilized in DLT systems cannot read the longer bar code labels associated with the LTO cartridges. That is, the bar code readers contained in the DLT systems do not have fields of view that are large enough to read the longer LTO labels in their entireties.

While it is possible to modify or replace DLT type bar code readers with bar code readers suitable for reading the longer LTO labels, such modification or replacement of the bar code readers is expensive and difficult to implement. Another solution to the problem would be to use "condensed" or "high density" bar code labels with the newer LTO cartridges. Such condensed or high density labels would allow the eight characters to be represented on a shorter label. Unfortunately, however, the resolution of the bar code readers utilized in DLT systems may not be sufficient to resolve the condensed or high density characters (e.g., bars) contained on such shorter labels. Consequently, it may still be necessary to modify or replace the current bar code readers, an expensive and undesirable circumstance.

Accordingly, a need remains for a bar code reading system capable of reading the entirety of a larger bar code label even though a portion of the bar code label is located outside the field of view of the bar code reading device. Ideally, the bar code reading system would be compatible with and require no physical modifications to the bar code reading device. In addition, the bar code reading system should be inexpensive, simple to use and not require a significant amount of time to implement.

SUMMARY OF THE INVENTION

A bar code reading system may comprise a first bar code label and a second bar code label. The first bar code label is positioned on an object at a first location and in a first orientation. The second bar code label is positioned on the object at a second location and in a second orientation. The first and second bar code labels each have indicia thereon that are representative of a label data set. A bar code reader positionable next to the object has a limited field of view such that the bar code reader reads only first and second portions of the first and second bar code labels. The bar code reader produces first and second data sets representative of the first and second portions. A data processing system operatively associated with the bar code reader combines the first and second data sets to produce a combined data set that is representative of the label data set.

Also disclosed is a method for reading bar code labels with limited-view bar code reading apparatus that comprises the steps of: Positioning a first bar code label on an object at a first location and in a first orientation, the first bar code label having indicia thereon that are representative of a label data set; positioning a second bar code label on the object at a second location and in a second orientation, the second bar code label having indicia thereon that are representative of the same label data set; positioning the bar code reader apparatus next to the object; operating the bar code reading apparatus to read first and second portions of the first and second bar code labels and to produce first and second data sets that are representative of the first and second portions; and combining the first and second data sets to produce a combined data set that is representative of the label data set.

BRIEF DESCRIPTION OF THE DRAWING

Illustrative and presently preferred embodiments of the invention are shown in the accompanying drawing in which.

DETAILED DESCRIPTION OF THE INVENTION

A bar code reading system 10 according to one preferred embodiment of the present invention is shown and described herein as it could be used in a data storage system 12 of the type well-known in the art to read bar code labels (e.g., first and second bar code labels 14 and 16) positioned on a data cartridge 18 contained in the data storage system 12. Alternatively, and as will be described in greater detail below, the bar code reading system 10 may be used in a wide range of other applications to read bar code labels positioned on any of a wide range of other objects.

Figure 1:
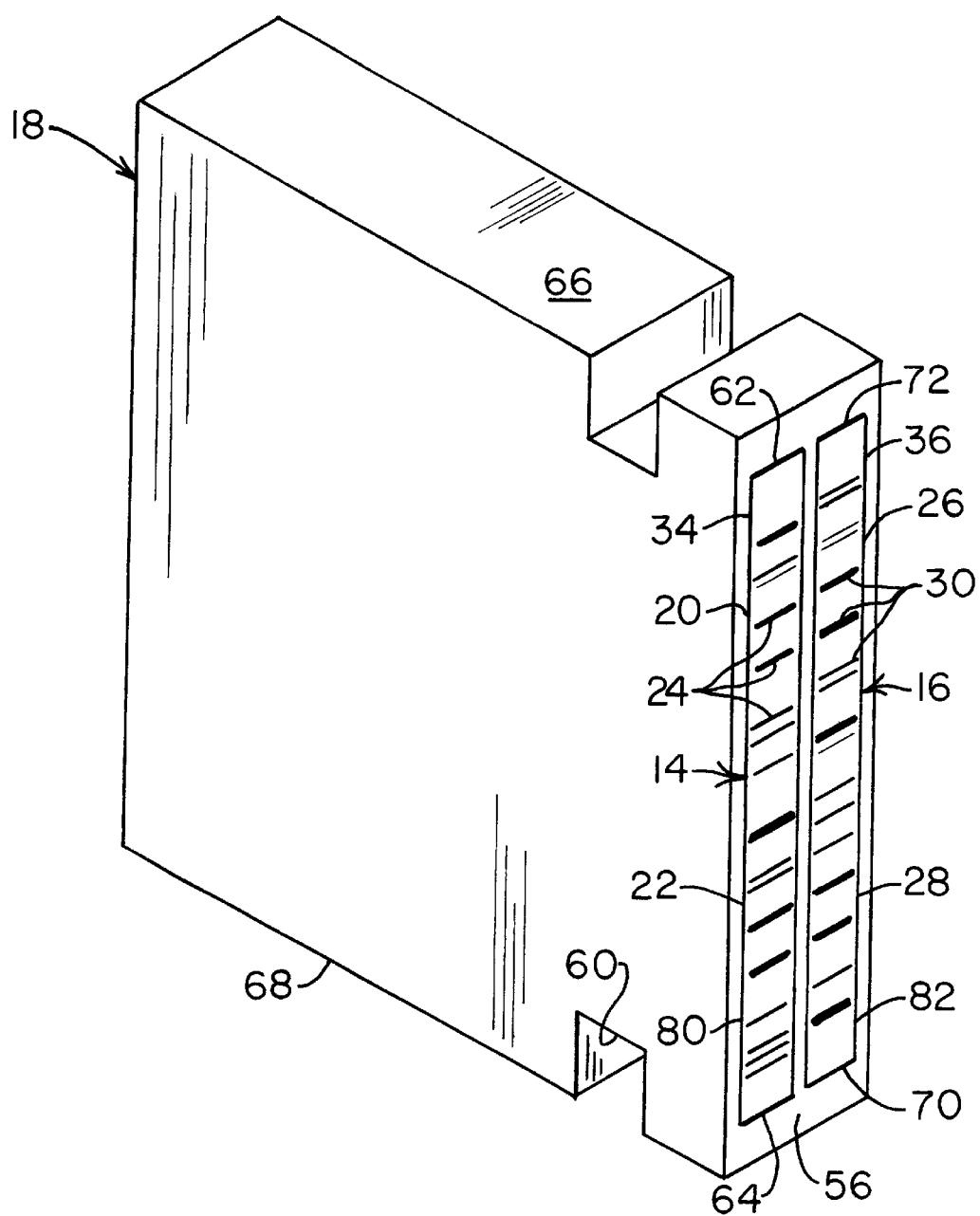
FIG. 1 is a perspective view of a data cartridge having two bar code labels positioned thereon.

Referring now to FIG. 1, the bar code reading system 10 may comprise a first bar code label 14 positioned on an object 18 (e.g., an LTO type of data cartridge) at a first location 20 and in a first orientation 22. The first bar code label 14 may have indicia or bars 24 thereon that are representative of a label data set. Similarly, a second bar code label 16 is positioned on the object 18 at a second location 26 and in a second orientation 28. The second bar code label 16 also has indicia or bars 30 thereon that are representative of the same label data set as the first bar code label 14. In the embodiment shown and described herein, the first and second bar code labels 14 and 16 are substantially identical and positioned in side-by-side relationship with the second label 16 being reversed with respect to the first label 14. That is, the second orientation 28 of the second label 16 is reversed with respect to the first orientation 22 the first label 14.

Figure 5:
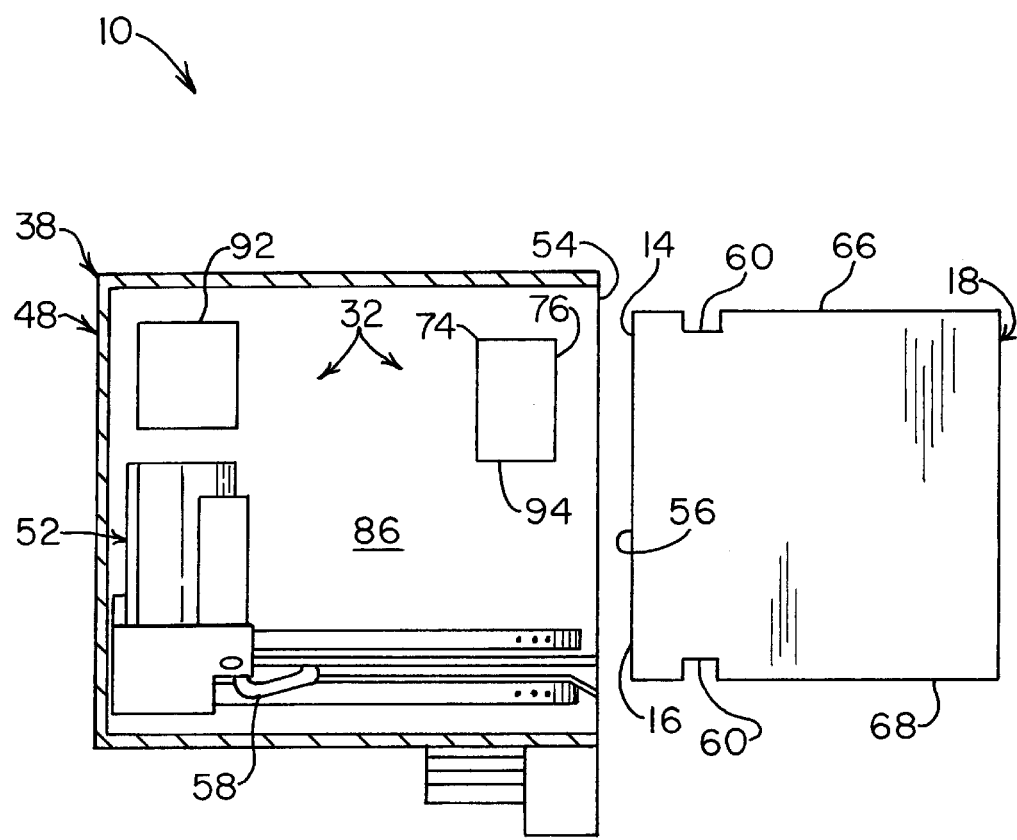
FIG. 5 is a simplified cross-sectional view in elevation of the bar code reading device shown positioned adjacent the bat code labels on the data cartridge.
Figure 6:
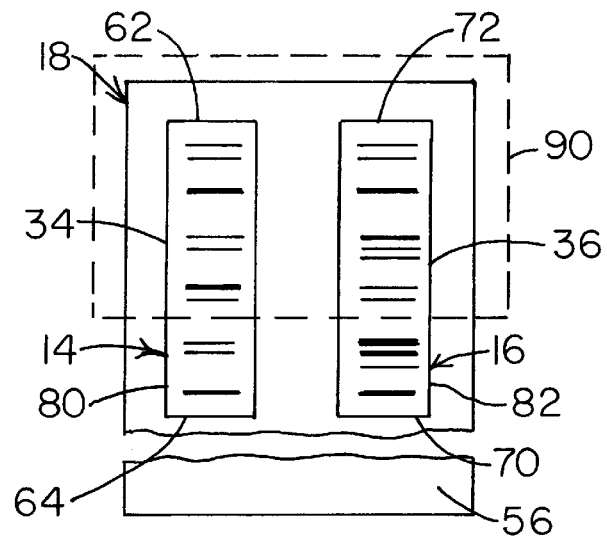
FIG. 6 is a side view in elevation of the data cartridge and bar code labels provided thereon showing the approximate extent of the limited field of view of the bar code reading device.

The bar code reading system 10 may further include a bar code reading device 32 that is positionable next to the object 18 on which the bar code labels 14, 16 are located. See FIGS. 4 and 5. In the embodiment shown and described herein, the bar code reading device 32 is mounted to a cartridge engaging assembly 38 associated with the data storage system 12. See FIGS. 2 and 4. The bar code reading device 32 may have a limited field of view 90 (shown in broken lines in FIG. 6) such that it reads only first and second portions 34 and 36 of the first and second bar code labels 14 and 16, respectively. The bar code reading device 32 produces first and second data sets (not shown) that are representative of the indicia or bars 24 and 30 contained within the first and second portions 34 and 36, respectively, of the first and second bar code labels 14 and 16. In the embodiment shown and described herein, the first and second portions 34 and 36 comprise the upper portions of the first and second bar code labels 14 and 16, respectively. In other words, the lower portions 80 and 82 of first and second bar code labels 14 and 16, respectively, are located outside the field of view 90 of the bar code reading device 32.

Figure 7:
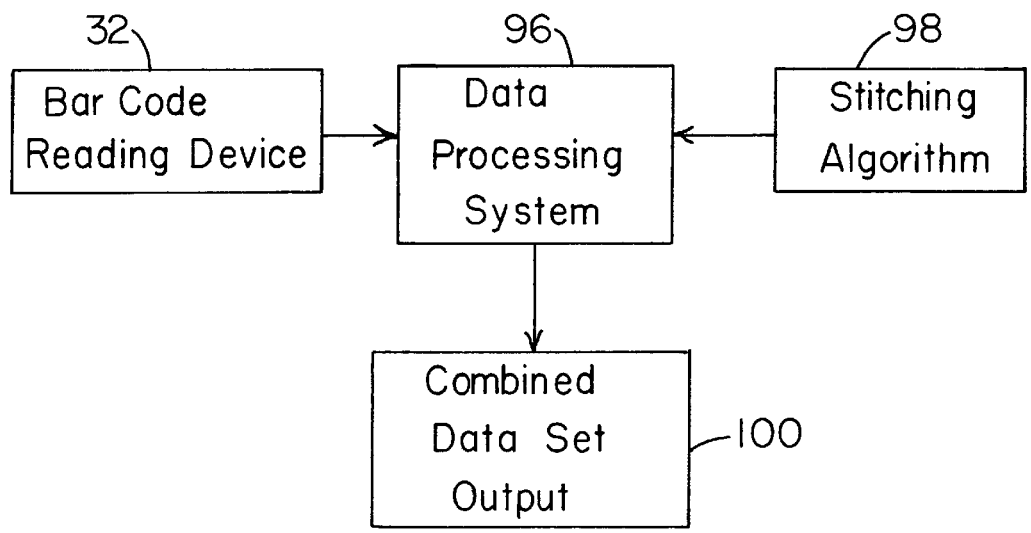
FIG. 7 is a flowchart representation of the bar code reading system according to the present invention.

The bar code reading system 10 may also comprise a data processing system 96 that is operatively associated with the bar code reading apparatus 32. See FIG. 7. More specifically, and as will be explained in greater detail below, the data processing system 96 implements the functionality of the bar code reading system 10 by combining together the first and second data sets to produce a combined or composite data set 100 that is representative of the entire label data set. That is, the composite data set 100 is representative of the label data set for the entire first bar code label 14 even though the lower portion 80 of first bar code label 14 is located outside the field of view 90 of the bar code reading device 32.

The bar code reading system 10 may be operated as follows to ascertain the label data set encoded on the entireties of the labels 14 and 16 even though portions 80 and 82 of the bar code labels 14 and 16 are located outside the field of view 90 of the bar code reading device 32. To start, the first and second bar code labels 14 and 16 are positioned side-by-side on the object 18 (e.g., the LTO data cartridge) with the second bar code label 16 being positioned in a reversed orientation 28 with respect to the orientation 22 of the first bar code label 14. Next, the bar code reading device 32 is positioned adjacent the object or data cartridge 18 so that the first and second portions 34 and 36 of the first and second bar code labels 14 and 16, respectively, are contained within the field of view 90 of the bar code reading device 32. The bar code reading device 32 is then actuated to read the first and second portions 34 and 36 of the labels 14 and 16, respectively, and to produce first and second data sets representative thereof. The data processing system 96 then combines the first and second data sets to produce the combined data set 100 that is representative of the label data set encoded on the first and second bar code labels 14 and 16.

A significant advantage of the present invention is that it enables a bar code reading device 32 to read an entire bar code label (i.e., 14 or 16) even though a portion (i.e., 80 or 82) of the bar code label may be located outside the field of view 90 of the bar code reading device 32. Accordingly, the bar code reading system 10 enables the bar code reading devices currently being used to read 6-character bar code labels provided on DLT data cartridges to read the longer, 8-character bar code labels provided on LTO data cartridges.

Another significant advantage of the present invention is that it can be implemented via a software or firmware change to the data processing system 96, thus does not require replacement or physical modification of the bar code reading device 32, the data storage system 12, or any of their respective components. The bar code reading system 10 is also simple to use and does not require a significant amount of time to implement.

Having briefly described the bar code reading system 10, as well as some of its more significant features and advantages, the various embodiments of the bar code reading system according to the present invention will now be described in detail. However, before proceeding with the description, it should be noted that although the bar code reading system 10 is shown and described herein as it could be used in a data storage system 12, the bar code reading system 10 could also be used in any of a wide range of other applications that utilize bar code reading devices. Accordingly, the present invention should not be regarded as limited to use with the particular data storage system 12 shown and described herein. It should also be noted that while the bar code labels 14 and 16 shown and described herein may be affixed to an LTO (linear tape open) data cartridge 18 having a standard size and configuration, the bar code labels may be affixed to almost any object imaginable. Accordingly, the present invention should not be regarded as limited to use with the LTO type of data cartridge 18 shown and described herein.

With the foregoing considerations in mind, one preferred embodiment of the bar code reading system 10 according to the present invention is shown and described herein as it may be used to read bar code labels 14 and 16 positioned on an LTO data cartridge 18 used in a data storage system 12.

The data storage system 12 in which the bar code reading system 10 may be used may comprise any of a wide range of data storage systems now known in the art or that may be developed in the future that are suitable for storing and accessing one or more data cartridges. By way of example, the data storage system 12 may comprise a data storage system of the type shown and described in U.S. Pat. No. 6,025,972 for "MULTI-PLANE TRANSLATING CARTRIDGE HANDLING SYSTEM" of Schmidtke, which is incorporated herein by reference for all that it discloses. Even though data storage systems are well-known in the art, a brief description of the data storage system 12 is provided below in order to provide a more complete description of one environment in which may be used the bar code reading system 10 of the present invention.

Figure 2:
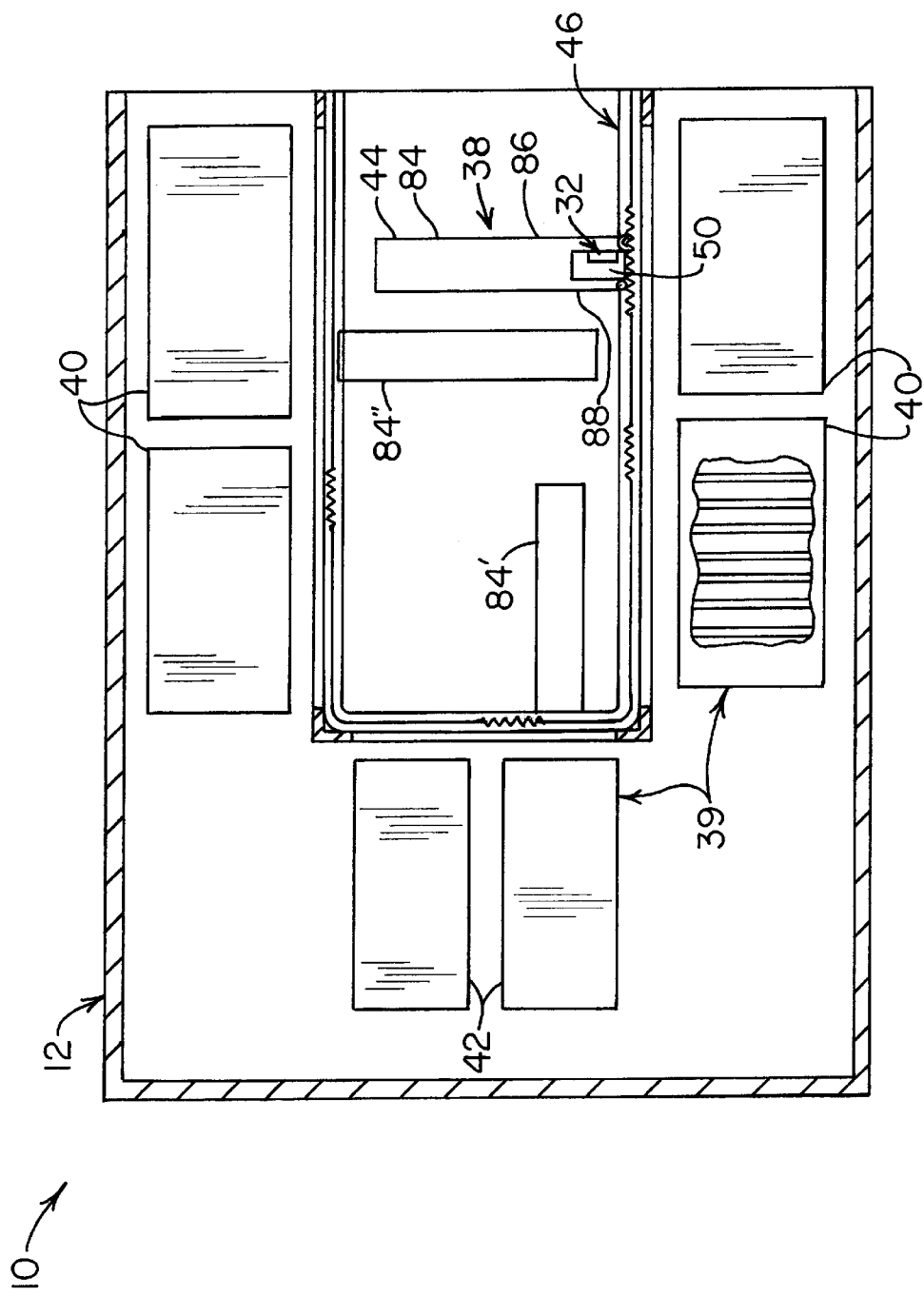
FIG. 2 is a plan view of a data storage system in which may be used in the data cartridge shown in FIG. 2.

Referring now primarily to FIG. 2, the data storage system 12 may comprise a cartridge engaging assembly or "picker" 38 that is capable of transferring data cartridges 18 between one or more cartridge receiving devices 39, such as one or more cartridge storage racks or magazines 40 and one or more cartridge read/write devices 42. The various cartridge receiving devices 39 (e.g., the cartridge storage racks or magazines 40 and the cartridge read/write devices 42) may be positioned at various locations within the data storage system 12 so that they define a generally U-shaped configuration, although other arrangements are possible.

The cartridge engaging assembly 38 may comprise a portion of a cartridge access device 44. The cartridge access device 44 may in turn comprise a portion of a cartridge positioning system 46 which moves the cartridge access device 44 to various positions (e.g., 84, 84', 84") along the various cartridge receiving devices 39 (e.g., the cartridge storage racks or magazines 40 and the cartridge read/write devices 42) to access the data cartridges 18 contained therein.

Figure 3:
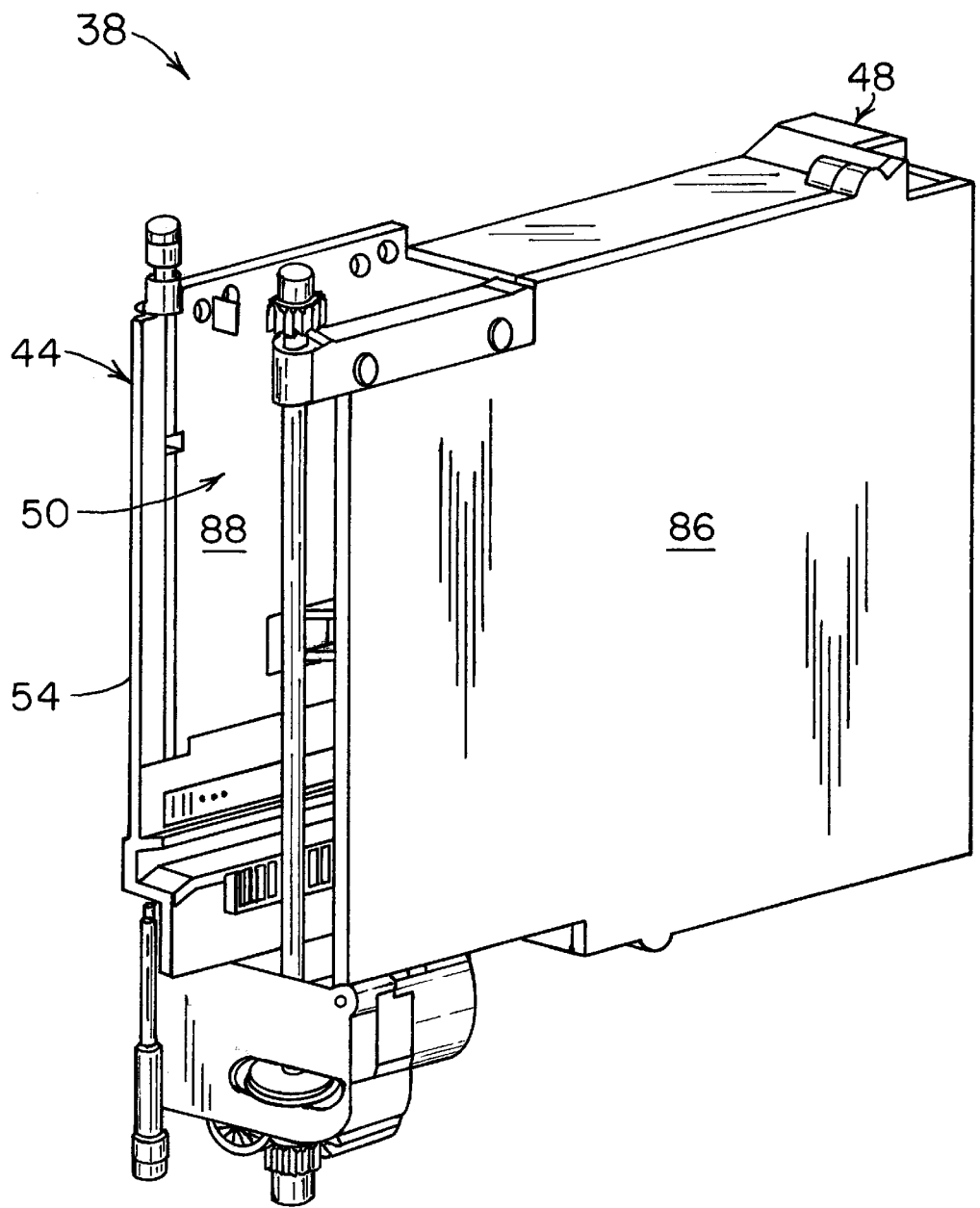
FIG. 3 is a perspective view of a media access device used in the data storage system shown in FIG. 2.

The cartridge engaging assembly 38 contained within the cartridge access device 44 is adapted to engage a data cartridge 18 contained in a cartridge receiving device 39 and to draw the data cartridge 18 into the cartridge access device 44. The cartridge engaging assembly 38 is also adapted to load or insert the data cartridge 18 into a cartridge receiving device 39, e.g., either the cartridge storage racks or magazines 40 or the cartridge read/write device 42, as the case may be. Stated simply, then, the cartridge engaging assembly 38 is used to retrieve data cartridges 18 from, and insert them into, the various cartridge receiving devices 39. The cartridge access device 44, which includes the cartridge engaging Referring primarily to FIGS. 3 and 4, the cartridge engaging assembly 38 may include a frame assembly 48 having opposed side members 86 and 88. The frame assembly 48 defines an interior chamber or cavity 50 sized to receive the data cartridge 18. A cartridge plunge mechanism or "thumb" assembly 52 may be slidably mounted to the frame assembly 48 so that the thumb assembly 52 may be moved toward and away from the cartridge access end 54 of frame assembly 48. The thumb assembly 52 may be provided with a finger assembly 58 configured to engage a notch 60 (FIG. 5) or other similar feature provided on the data cartridge 18. The finger assembly 58 allows the thumb assembly 52 to engage and withdraw the data cartridge 18 from the cartridge receiving devices 39.

The data storage system 12 may be connected to a host computer system (not shown) that issues commands to a control system (not shown) contained within the data storage system 12. For example, in one operational sequence, the control system (in response to commands from the computer system) actuates the cartridge positioning system 46 which moves the cartridge access device 44 along the cartridge storage racks 40 until it is positioned adjacent the desired data cartridge 18. The cartridge engaging assembly 38 then removes the data cartridge 18 from the cartridge storage rack 40 and draws it into the cartridge access device 44. The cartridge access device 44 then transports the data cartridge 18 to the cartridge read/write device 42. The cartridge 18 is inserted into the cartridge read/write device 42 so that the host computer may thereafter read data from or write data to the data cartridge 18. After the read/write operation is complete, the cartridge engaging assembly 38 removes the data cartridge 18 from the cartridge read/write device 42 and draws it back into the cartridge access device 44 SO that the cartridge 18 may be returned to its appropriate location in the cartridge storage rack 40.

Regardless of the particular type of data storage system 12 in which the bar code reading system 10 is used, the bar code reading system 10 according to the present invention may comprise a first bar code label 14 and a second bar code label 16. See FIG. 1. The first bar code label 14 may have indicia 24 thereon that are representative of a label data set. In the embodiment shown and described herein, the first bar code label 14 comprises a generally rectangular shape having first and second ends 62 and 64. The indicia 24 may comprise horizontal bars, some of which are located outside the field of view 90 of the bar code reading device 32. See FIG. 6. Alternatively, the first bar code label 14 may comprise other shapes and configurations, as would be obvious to persons having ordinary skill in the art after having become familiar with the teachings of the present invention.

The first bar code label 14 may be positioned on the data cartridge 18 at a first location 20 and in a first orientation 22. In the embodiment shown and described herein, the first bar code label 14 is positioned on the access end 56 of data cartridge 18 SO that its first and second ends 62 and 64 are adjacent the top and bottom surfaces 66 and 68, respectively, of data cartridge 18. Alternatively, other configurations are possible, as would be obvious to persons having ordinary skill in the art after having become familiar with the teachings of the present invention. For example, the first bar code label 14 may be oriented differently or may be positioned on another surface of data cartridge 18 (e.g., top surface 66, bottom surface 68).

The first bar code label 14 may be secured to the data cartridge 18 by using any of a wide range of mounting systems and methods. For example, in one preferred embodiment, the first bar code label 14 may be provided with a pressure-sensitive adhesive thereon to allow the label 14 to be affixed to the access end 56 of the data cartridge 18. In another embodiment, the first bar code label 14 may be secured to the data cartridge 18 with a separately applied glue. In yet another embodiment, the first bar code label 14 need not even comprise a separately applied label, but could instead be formed via a printing process in which the indicia 24 are applied directly to the cartridge 18. In the embodiment shown and described herein, the first bar code label 14 may be fabricated from any of a wide range of materials (e.g., paper or plastic) that would be suitable for the intended application. In one preferred embodiment, the first bar code label 14 is fabricated from paper.

The second bar code label 16 may be substantially identical to the first bar code label 14 just described. That is, the second bar code label 16 may have indicia 30 thereon representative of the same label data set as the first bar code label 14. As was the case for the first bar code label 14, the second bar code label 16 may also comprise a generally rectangular shape having first and second ends 70 and 72. The indicia 30 may comprise horizontal bars, some of which are located outside the field of view 90 of the bar code reading device 32. See FIG. 6.

The second bar code label 16 may be positioned on the data cartridge 18 at a second location 26 and in a second orientation 28. In the embodiment shown and described herein, the second bar code label 16 is positioned on the access end 56 of data cartridge 18 so that it is adjacent the first bar code label 14. More specifically, the second bar code label 16 is positioned in side-by-side relationship with the first bar code label 14 so that the first and second ends 70, 72 of the second bar code label 16 are adjacent the second and first ends 64, 62, respectively, of the first bar code label 14. In other words, the orientation 28 of the second bar code label 16 is reversed with respect to the orientation 22 of the first bar code label 14.

The second bar code label 16 may be secured to the data cartridge 18 by using any of a wide range of mounting systems and methods. For example, in one preferred embodiment, the second bar code label 16 may be provided with a pressure-sensitive adhesive thereon to allow the second bar code label 16 to be affixed to (or mounted on) the access end 56 of the data cartridge 18. Alternatively, other mounting systems and methods may be used to affix the second bar code label 16 to the data cartridge 18.

The second bar code label 16 may be fabricated from any of a wide range of materials (e.g., paper or plastic) that would be suitable for the intended application. In one preferred embodiment, the second bar code label 16 is fabricated from paper.

Figure 4:
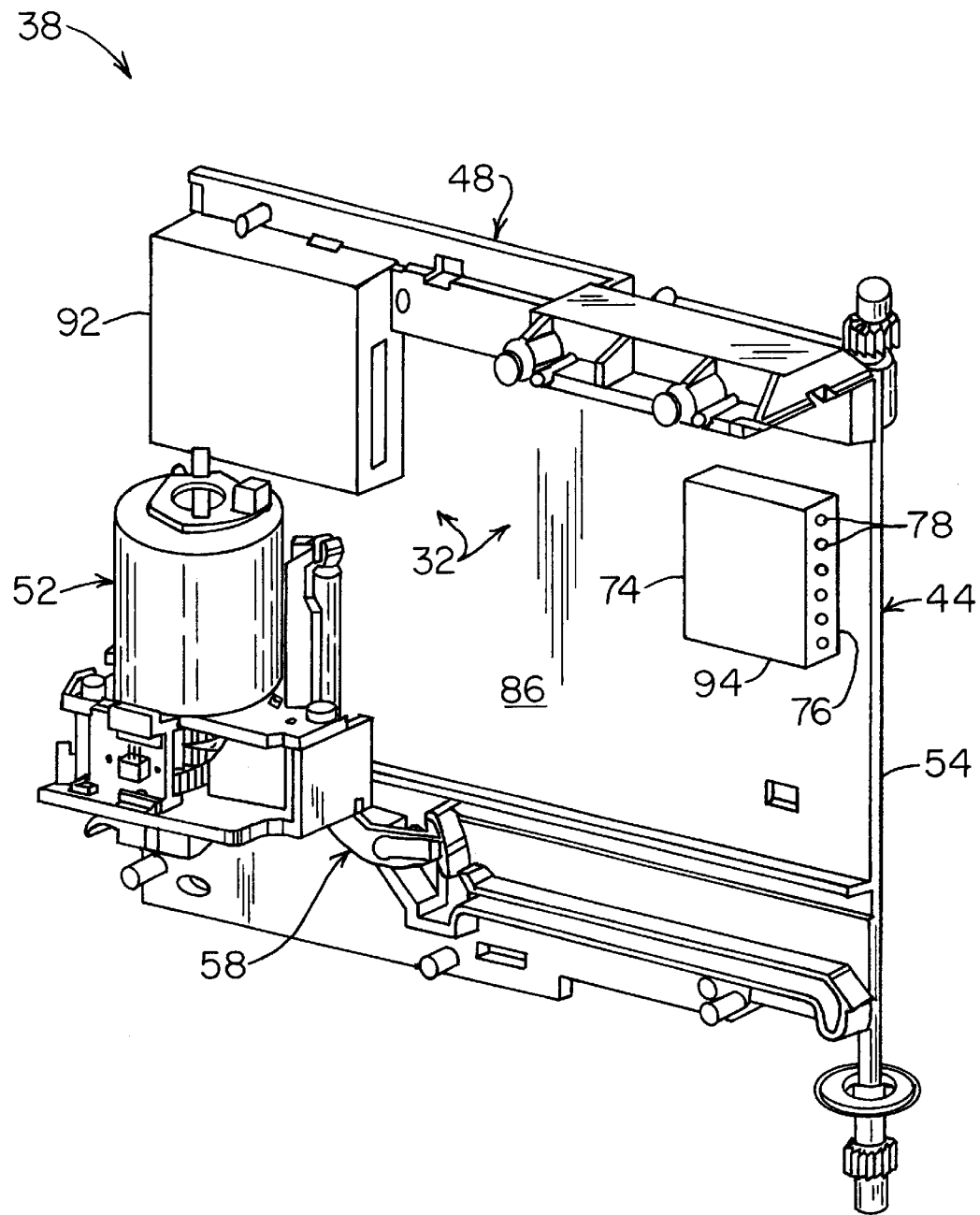
FIG. 4 is a perspective view of the media access device shown in FIG. 3 with a side member removed to show the bar code reading device.

The bar code reading system 10 may further include a bar code reading device 32. Since the data storage system 12 may contain numerous data cartridges 18, the bar code reading device 32 may be moveable or positionable next to the data cartridges 18 so that it can read the portions of the bar code labels positioned thereon. It is generally preferred, but not required, that the bar code reading device 32 be mounted to the cartridge access device 44 so that the bar code reading device 32 moves along with the cartridge access device 44. In the embodiment shown and described herein, the bar code reading device 32 is mounted to the side member 86 within the cavity 44 defined by the frame assembly 38, as best seen in FIG. 4. In such an arrangement, the bar code reading device 32 is moved and positioned adjacent the data cartridge 18 when the cartridge access device 44 is moved and positioned adjacent the data cartridge 18. See FIG. 5. Alternatively, other mounting arrangements and methods for moving the bar code reading device 32 are possible, as would be obvious to persons having ordinary skill in the art after having become familiar with the teachings of the present invention. Accordingly, the present invention should not be regarded as limited to the particular arrangement shown and described herein.

In one preferred embodiment, the bar code reading device 32 may comprise a detector 92 and a light source 94. The light source 94 is contained within a generally rectangularly shaped housing 74. The housing 74 may comprise a transparent front surface 76 to allow the light source 94 contained therein (e.g., light emitting diodes 78) to illuminate the first and second portions 34 and 36 of bar code labels 14 and 16, respectively. See FIG. 4.

The detector 92 detects the indicia contained on the labels and produces an output signal that is related thereto. If the detector 92 was originally designed to read labels that do not extend along the full length of the data cartridge, the detector 92 may have a limited field of view 90. For example, referring now to FIG. 6, the limited field of view 90 of detector 92 may be such that it reads only respective first and second portions 34 and 36 of the first and second bar code labels 14 and 16. If so, the bar code reading device 32 reads only the upper portions 34 and 36 of the first and second bar code labels 14 and 16, respectively. Stated differently, the lower portions 80 and 82 of bar code labels 14 and 16, respectively, are located outside the field of view 90 of the detector 92, thus will not be read by the bar code reading device 32. Consequently, the bar code reading device 32 will produce a first data set (not shown) that is representative of the first portion 34 of the first bar code label 14 and a second data set (also not shown) that is representative of the second portion 36 of the second bar code label 16. As discussed later, the first and second data sets are combined by the data processing system 96 associated with the bar code reading device 32 to produce a composite data set 100 that is representative of the label data set.

It should be noted that the bar code reading device 32 may comprise any of a wide range of bar code reading devices that are well-known in the art and readily commercially available. However, since bar code reading devices are well-known in the art and could be readily provided by persons having ordinary skill in the art after having become familiar with the teachings of the present invention, the various components of the particular bar code reading device 32 that are utilized in one preferred embodiment of the present invention will not be described in further detail herein.

To carry out the functionality of the bar code reading system 10, a data processing system 96 may be provided that is operatively associated with the bar code reading device 32. See FIG. 7. More specifically, and as explained in greater detail below, the data processing system 96 implements the functionality of the bar code reading system 10 by combining or "stitching" together the first and second data sets produced by the bar code reading device 32 to form a combined data set 100 that is representative of the entire label data set.

The data processing system 96 may be built into or reside in the bar code reading device 32. In other words, the bar code reading device 32 may include the data processing system 96 so that the combining or "stitching" together of the first and second data sets occurs within the bar code reading device 32. Alternatively, the data processing functions may occur within the host computer system (e.g., via data processing software operated on microprocessors contained within the computer system). In another alternative embodiment, the data processing functions may be split between the bar code reading device 32 and the computer system with each system performing portions of the processing functions. In any event, a suitable arrangement for the data processing system 96 may be easily arrived at by persons having ordinary skill in the art after considering the requirements for the particular application and after becoming familiar with the teachings of the present invention.

The stitching algorithm 98 utilized by the data processing system 96 to stitch together the first and second data sets may comprise any of a wide range of stitching algorithms now known in the art or that may be developed in the future that would be suitable for combining together portions of data captured from two different sources. For example, in one preferred embodiment of the present invention, the data processing system 96 reads or detects the first four data characters from the first label 14 and the last four characters from the second label 16. The stitching algorithm 98 is then implemented to combine the two data sets into a single data set that is representative of the entire data set encoded on the bar code labels 14, 16. However, since such stitching algorithms 98 are known in the art and could be easily provided by persons having ordinary skill in the art after having become familiar with the teachings of the present invention, the particular stitching algorithm 98 utilized in one preferred embodiment of the present invention will not be described in further detail herein.

The bar code reading system 10 may be used in a data storage system 12 as follows to enable a bar code reading device 32 having a limited field of view 90 to read larger bar code labels (e.g., such as 8-character labels). Initially, the first and second bar code labels 14 and 16 are positioned side-by-side on the access end 56 of a data cartridge 18. The second bar code label 16 is positioned in a reversed orientation 28 with respect to the orientation 22 of the first bar code label 14. The data cartridge 18 is then placed in the data storage system 12. Next, the bar code reading device 32 is positioned adjacent the cartridge 18 so that the first and second portions 34 and 36 of bar code labels 14 and 16, respectively, are within its limited field of view 90. The bar code reading device 32 is then actuated to read the first and second portions 34 and 36 and to produce first and second data sets representative thereof. The data processing system 96 utilizes the stitching algorithm 98 to combine or stitch together the first and second data sets to form a combined data set 100 that is representative of the entire label data set encoded on the first and second bar code labels 14 and 16.

Other configurations are possible for the two bar code labels 14 and 16 shown and described herein. For example, in an alternate arrangement, the first bar code label 14 may comprise a long, low-density bar code label of the type just described, whereas the second bar code label 16 could comprise a shorter, but higher density bar code label. The second label 16 may be the primary label read by the bar code reading device 32. Then, if a read error occurred reading the second label 16, the data processing system 96 could refer to the data captured from the first label 14. While only a portion of the first label 14 may be contained within the field of view 90 of the reader 32, the data processing system 96 will be capable of recovering from the error if the error occurred in that portion of the data that is readable from the first label 14.

It is contemplated that the inventive concepts herein described may be variously otherwise embodied and it is intended that the appended claims be construed to include alternative embodiments of the invention except insofar as limited by the prior art.

What is claimed is:

1. A bar code reading system, comprising:
   a first bar code label positioned on an object at a first location and in a first orientation, said first bar code label having indicia thereon representative of a label data set;
   a second bar code label positioned on the object at a second location and in a second orientation, said second bar code label having indicia thereon representative of the label data set;
   bar code reading apparatus positionable next to the object, said bar code reading apparatus having a limited field of view such that said bar code reading apparatus reads only first and second portions of said first and second bar code labels, said bar code reading apparatus producing first and second data sets representative of the first and second portions; and
   a data processing system operatively associated with said bar code reading apparatus, said data processing system combining said first and second data sets to produce a combined data set representative of the label data set.

2. The bar code reading system of claim 1, wherein the second location is adjacent the first location so that said second bar code label is located adjacent said first bar code label.

3. The bar code reading system of claim 1, wherein the second orientation is reversed with respect to the first orientation.

4. The bar code reading system of claim 1, wherein said first bar code label comprises a first end and a second end, wherein said second bar code label is substantially identical to said first bar code label, and wherein said second bar code label comprises a first end and a second end.

5. The bar code reading system of claim 4, wherein said first and second bar code labels are positioned on said object in side-by-side relationship so that the second end of said second bar code label is adjacent the first end of said first bar code label.

6. The bar code reading system of claim 1, wherein the first portion of said first bar code label comprises an upper portion of said first bar code label, and wherein the second portion of said second bar code label comprises an upper portion of said second bar code label.

7. The bar code reading system of claim 1, wherein the first portion of said first bar code label comprises a lower portion of said first bar code label, and wherein the second portion of said second bar code label comprises a lower portion of said second bar code label.

8. The bar code reading system of claim 1, wherein said data processing system comprises a stitching algorithm.

9. A bar code reading system, comprising:
 first label means for representing a label data set;
 second label means for representing the label data set;
 means for reading a first portion of said first label means and for producing a first data set representative thereof;
 means for reading a second portion of said second label means and for producing a second data set representative thereof; and
 means for combining the first and second data sets to produce a combined data set representative of the label data set.

10. A method for reading bar code labels with limited-view bar code reading apparatus, comprising:
 positioning a first bar code label on an object at a first location and in a first orientation, said first bar code label having indicia thereon representative of a label data set;
 positioning a second bar code label on the object at a second location and in a second orientation, said second bar code label having indicia thereon representative of the label data set;
 positioning said bar code reading apparatus next to said object;
 operating said bar code reading apparatus to read first and second portions of said first and second bar code labels and to produce first and second data sets representative of said first and second portions; and
 combining said first and second data sets to produce a combined data set representative of the label data set.

11. A bar code reading system, comprising:
 a first bar code label positioned on an object at a first location and in a first orientation, said first bar code label having indicia thereon representative of a label data set;
 a second bar code label positioned on the object at a second location and in a second orientation, said second bar code label having indicia thereon representative of the label data set;
 bar code reading apparatus positionable next to the object, said bar code reading apparatus having a limited field of view such that said bar code reading apparatus reads only a first portion of said first bar code label, said bar code reading apparatus producing a first data set representative of the first portion of said first bar code label and a second data set representative of said second bar code label; and
 a data processing system operatively associated with said bar code reading apparatus, said data processing system combining said first and second data sets to produce a combined data set representative of the label data set.

12. The bar code reading system of claim 11, wherein the second position is adjacent the first position so that said second bar code label is located adjacent said first bar code label.

13. The bar code reading system of claim 11, wherein the second orientation is reversed with respect to the first orientation.

14. The bar code reading system of claim 11, wherein said first bar code label comprises a first end and a second end, wherein said second bar code label comprises a first end and a second end.

15. The bar code reading system of claim 14, wherein said first and second bar code labels are positioned on said object in side-by-side relationship so that the second end of said second bar code label is adjacent the first end of said first bar code label.

16. The bar code reading system of claim 11, wherein said second bar code label is entirely within the field of view of said bar code reading apparatus.

17. The bar code reading system of claim 16, wherein said first bar code label comprises a low density label and wherein said second bar code label comprises a high density label.

18. A code reading system, comprising:
 a first machine-readable code positioned on an object at a first location and in a first orientation, said first machine-readable code having indicia therein representative of a code data set;
 a second machine-readable code positioned on the object at a second location and in a second orientation, said second machine-readable code having indicia therein representative of the code data set;
 code reading apparatus positionable next to the object, said code reading apparatus having a limited field of view such that said code reading apparatus reads only first and second portions of said first and second machine-readable codes, said code reading apparatus producing first and second data sets representative of the first and second portions; and
 a data processing system operatively associated with said code reading apparatus, said data processing system combining said first and second data sets to produce a combined data set representative of the code data set.

19. The code reading system of claim 18, wherein the second location is adjacent the first location so that said second machine-readable code is located adjacent said first machine-readable code and so that the second orientation is reversed with respect to the first orientation.

20. The bar code reading system of claim 18, wherein said first machine-readable code comprises a first end and a second end, wherein said second machine-readable code is substantially identical to said first machine-readable code, and wherein said second machine-readable code comprises a first end and a second end, said first and second machine-readable codes being positioned on said object in side-by-side relationship so that the second end of said second machine-readable code is adjacent the first end of said first machine-readable code.

21. A method for reading machine-readable code with a code reading apparatus having a limited field of view, comprising:
 positioning a first machine-readable code on an object at a first location and in a first orientation, said first machine-readable code having indicia thereon representative of a code data set;
 positioning a second machine-readable code on the object at a second location and in a second orientation, said second machine-readable code having indicia thereon representative of the code data set;
 positioning said code reading apparatus next to said object;
 operating said code reading apparatus to read first and second portions of said first and second machine-readable codes and to produce first and second data sets representative of said first and second portions; and
 combining said first and second data sets to produce a combined data set representative of the code data set.

* * * * *